United States Patent [19]

Evans

[11] 3,946,645

[45] Mar. 30, 1976

[54] PROTECTIVE AIR LOCK

[75] Inventor: Herbert W. Evans, Scarsdale, N.Y.

[73] Assignee: The United States of America as represented by the United States Energy Research and Development Administration, Washington, D.C.

[22] Filed: Dec. 14, 1949

[21] Appl. No.: 132,921

[52] U.S. Cl. .................................... 98/1.5; 98/33 R

[51] Int. Cl.² .......................................... B64D 13/00

[58] Field of Search ............ 98/1, 29, 31, 32, 33, 8, 98/50, 54

[56] References Cited

UNITED STATES PATENTS

| | | | |
|---|---|---|---|
| 587,700 | 8/1897 | Cadwell | 98/31 |
| 1,002,407 | 9/1911 | Kleinschmidt | 98/32 |
| 2,345,204 | 3/1944 | Lodwig | 98/29 |
| 2,482,770 | 9/1949 | Heineman | 98/29 |

*Primary Examiner*—Samuel Feinberg
*Attorney, Agent, or Firm*—Dean E. Carlson; Leonard Belkin

[57] ABSTRACT

A device suitable for preventing escape and subsequent circulation of toxic gases comprising an enclosure which is sealed by a surrounding air lock, automatic means for partially evacuating said enclosure and said air lock and for ventilating said enclosure and means for disconnecting said enclosure ventilating means, whereby a relatively undisturbed atmosphere is created in said enclosure.

6 Claims, 4 Drawing Figures

INVENTOR.
HERBERT W. EVANS

BY

Roland A. Anderson
Attorney

INVENTOR.
HERBERT W. EVANS

BY

Roland A. Anderson
Attorney

PROTECTIVE AIR LOCK

The present invention was made under or during the course of a contract with the United States Energy Research and Development Administration or a predecessor thereof.

The present invention relates to an enclosure suitable for preventing escape and subsequent circulation of toxic gases.

Storage and handling of toxic gases often gives rise to situations in which personnel are placed in danger because of leaks of these gases into the working area. In a large plant in which such gases are present the removal of escaped toxic gases to the plant exterior by the ventilating system does not dispose of the problem of protecting plant personnel, as such gases, if appreciably heavier than air, tend to disperse into the area adjacent the plant in toxic concentrations and to remain there for an extended period of time.

In other cases, the gas may be caused to flow through the plant by being taken up by the ventilating system, either from an internal source or after having been exhausted to the building exterior where it is drawn into an external inlet of the ventilation system when the gas remains in toxic concentrations outside the plant.

It is accordingly an object of the present invention to provide a ventilating system which affords adequate ventilation of enclosures within the plant in which toxic or dangerous fumes may be generated and which prevents the distribution of said fumes to personnel-occupied areas.

It is another object of the present invention to provide a ventilating system which may be employed in enclosures into which toxic fumes may ordinarily pass by leakage or diffusion.

Other objects of the invention will be in part apparent and in part pointed out hereinafter.

In one of its broader aspects, the objects of the present invention are achieved by providing an enclosure which is sealed by a surrounding air lock, automatic means for partially evacuating said enclosure and said air lock and for ventilating said enclosure, means for disconnecting said enclosure ventilating means, whereby a relatively undisturbed atmosphere is created in said enclosure.

The enclosure provided by the present invention effectively seals and isolates the toxic gas from the remainder of the plant. When sealed in this manner the gas may be removed by treating it with suitable chemicals to produce a non-toxic product which may be disposed of easily.

The apparatus of the present invention will be described with reference to the drawings which show a structure incorporating a preferred embodiment of the invention and wherein.

Figure 1:
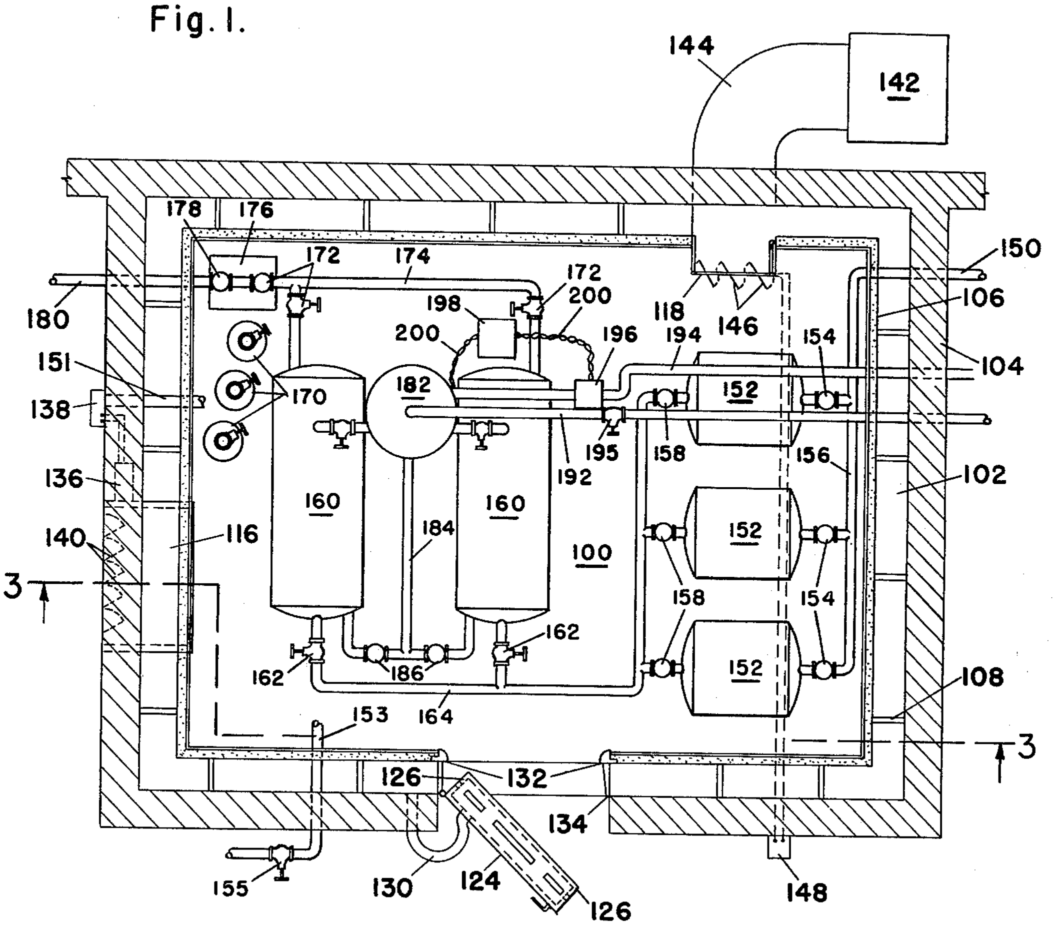
FIG. 1 is a horizontal section of the enclosure at the level of the top of the room, showing the ventilating system, air lock and enclosed equipment.

Referring specifically to FIG. 1, an inner enclosure 100 is enveloped by an air lock 102 which is formed between an outer enclosure comprising a structurally supporting wall 104 and a relatively thin plaster inner wall 106 defining said inner closure. The clearance between these two walls is about 4 inches. The relatively thin plaster inner wall 106 is supported by and attached to the outside structurally supporting wall 104 by the metal studs or clips 108. As illustrated more clearly in FIG. 2, the plaster wall consists of an expanded wire mesh 110 to which are applied several coats of dense plaster 112. The plaster wall as formed is relatively porous and it is therefore preferred to coat the surface exposed to the atmosphere within the enclosure 100 with several layers of paint 114 to reduce the porosity of said wall 106. A seal is provided at all points of the wall 106 which are pierced by conduits or registers and also where said wall 106 terminates at a surface such as the floor or ceiling surface by a suitable calking compound.

Figure 2:
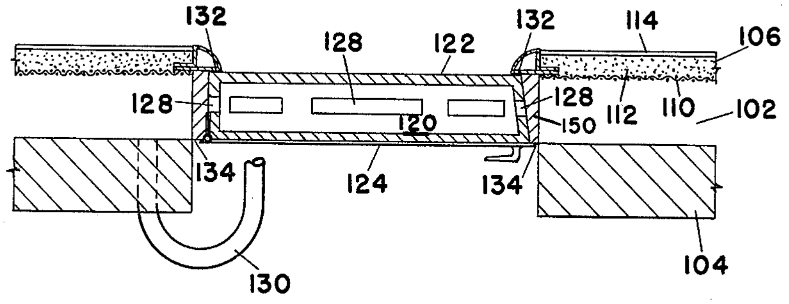
FIG. 2 is a horizontal section of the door of said enclosure showing details of the door frame and the wall construction.
Figure 4:
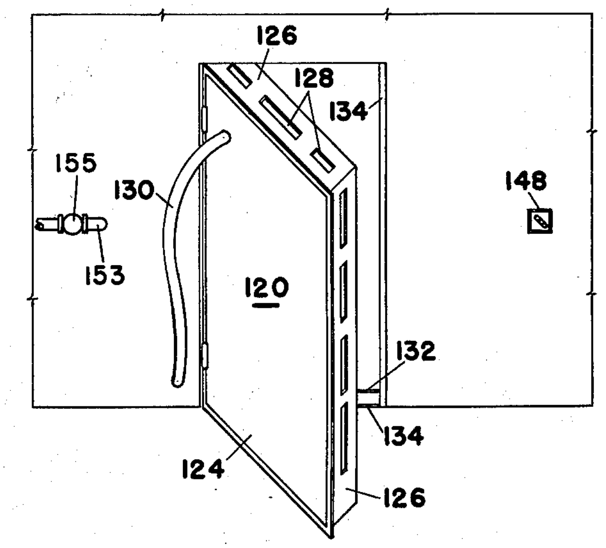
FIG. 4 is a perspective view of the door standing ajar showing details of the leak preventing slots therein.

The structural details of the door 120 may be most clearly seen with reference to FIGS. 2 and 4. The door 120 is a hollow rectanguloid which may be formed by connecting the juxtaposed plates 122 and 124 at their perimeters by a strip 126 having leak preventing slots 128 therein which form a discontinuous line which bisects the strip longitudinally. The flexible conduit 130 connects the chamber within the door 120 with air lock 102. The surfaces 132 and 134, with which the edges of the plates 122 and 124 respectively, come in contact when the door is closed, are provided in the door frame. The door jamb 150 is beveled on that portion of the surface which contacts the strip 126, so as to cause this portion of the strip 126 to be flush with the jamb 150 when the door 120 is in a closed position. The purpose of the slots 128 in the door 120 is to prevent any transfer of gas in either direction past the door. Leakage of gas from the enclosure 100 outward to the ambient atmosphere is prevented in part by the contact of the edges of the plate 122 with the door frame surface 132. Any gas leaking past these surfaces is necessarily small because of the close contact therebetween. Gas is further prevented from reaching the ambient atmosphere due to the leaking gas being drawn through the slots. A relatively lower pressure of gas exists within the door chamber because of the constant withdrawal of gas from the chamber through the flexible conduit 130, the air lock 102, and the conduit 144 leading to the blower 142. Similarly, the leakage of gas from the ambient atmosphere inward to the enclosure 100 past the door 120 is substantially prevented by the close contact of the door plate 124 with the jamb surface 134. Any transfer of gas which does occur past this surface 134 is remedied by the suction action mentioned above.

The register 116 for the controlled air intake to the inner enclosure 100 comprises an arrangement of louvers or vanes 140 of a conventional type, the openings between the vanes being adjustable by motor 136 which acts responsive to a pressure sensitive switch 138. The switch 138 may be set to detect the difference in pressure between the ambient atmosphere in which it is located and the atmosphere within enclosure 100 to which it is connected by means of conduit 151. The switch 138 actuates motor 136 when the difference in pressure between the ambient atmosphere and the enclosure 100 falls below a value predetermined by the setting of the switch 138. Motor 136 when so actuated causes the openings between the vanes 140 to be made smaller or larger sufficient to maintain the difference in pressure at the predetermined level.

The blower 142 external to the enclosure 100 is connected by conduit 144 to the protective air lock 102 and also to the enclosure 100 through air lock 102 and register 118, which register serves as a means for the controlled air removal from the inner enclosure 100. The register 118 consists of an arrangement of louvers or vanes 146 similar to those of register 116, the opening and closing of vanes 146 being adjustable by manually operated pressure control switch 148. It is important that switch 148 is located outside room 100.

While the room is in normal use it is preferred to keep the door closed. When the door is closed, the ventilation of the room is provided as follows: The register 118 is kept open. The blower 142 causes a flow of air from the enclosure 100 and from air lock 102 through conduit 144, thereby creating a relatively low pressure with respect to the ambient atmosphere, in the enclosure 100, air lock 102 and hollow door 120. The pressure sensitive switch 138 automatically responds to the pressure change to cause the louvers 140 of the register 116 to be opened when the pressure within the enclosure 100 falls to from ⅛ to ¼ inch hydrostatic pressure below the pressure of the ambient atmosphere and to remain open a sufficient amount to maintain the pressure within the enclosure at ¼ inch hydrostatic pressure below the pressure of the ambient atmosphere. Approximately 7 changes of air per hour are circulated through the enclosure in this manner.

Figure 3:
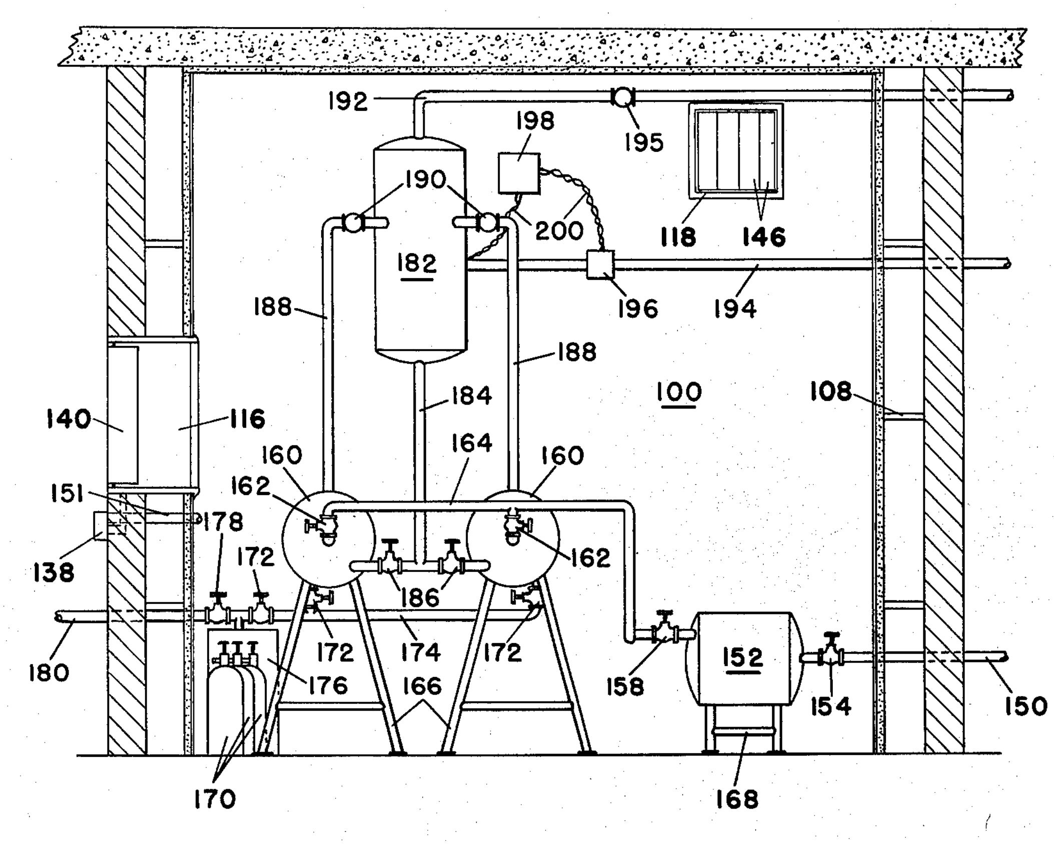
FIG. 3 is a vertical section of FIG. 1 along broken line 3—3.

Referring now to FIGS. 1 and 3 an apparatus in connection with which the present invention has particular utility may be described as follows. A condensable highly toxic process gas is introduced into the chamber 100 through a conduit 150 from process equipment not shown. Storage receptacles 152 for the gas are connected with the inlet conduit 150 through the valves 154 and the manifold 156. The gas is stored in the receptacles 152 initially before being condensed in the cold traps 160. Receptacles 152 are connected with cold traps 160 through the valves 158 and 162 and the conduit manifold 164. The cold traps 160 are supported on the bracket stands 166 and the receptacles 152 on the base stands 168. After being condensed within the cold traps 160 the process gas is removed in a liquid form to the tanks 170 through the valves 172 and manifold 174. A tank 170 may be kept in the heating box 176 while the condensate is delivered thereto if special temperature conditions are necessary. The heating box also serves to vaporize the contents of the tanks 170, if it be desired to volatilize the contents after storage and return the contents through valve 178 and conduit 180 to the processing equipment in the plant from which it was removed. To effect the condensation within the cold traps 160 a coolant liquid is delivered from the tank 182 through the conduit manifold 184 and valves 186 to the cold traps 160. The vaporized coolant is returned from the traps through the conduits 188 and the valves 190 to the tank 182, and excessive coolant gas passes from the tank 182 through the conduit 192 and valve 195 to the refrigerant compressors (not shown) external to the chamber 100. The liquid refrigerant is delivered from the compressors to the tank 182 through the conduit 194 and solenoid control valve 196. The valve 196 is controlled by the level control mechanism 198 which acts responsive to the change in level in tank 182 to keep the level therein approximately constant. The leveling mechanism 198 is operatively connected between the tank 182 and the control valve 196 by the electrical conductors 200.

Electrical resistance heaters (not shown) may be incorporated in the process gas handling equipment where needed to prevent solidification.

The connecting and disconnecting of containers of process gas and the "vaporizing" and condensing of the gas employing such apparatus as that described above involves the possibility of leaks of large volumes of gas due to failure of a valve to close properly or the like. For the purpose of illustration the operation of the apparatus of the present invention is described with respect to processing uranium hexafluoride although it will be realized that numerous other toxic gases may be processed similarly.

When a serious leak occurs in apparatus within the enclosure 100 operating personnel leave the enclosure closing door 120 and turn pneumatic switch 148 so as to cause the louvers 146 of the air removal register 118 to close. As the removal of air by the blower through the register 118 ceases, the pressure within the enclosure 100 builds up and becomes equal to that of the ambient atmosphere. The switch 138 acts responsive to this change of pressure to cause the motor 136 to close the louvers 140 of register 116. With the registers 116 and 118 and the door 120 closed, the enclosure 100 into which uranium hexafluoride was escaped is sealed from the remainder of the building of which enclosure 100 is a part, and is sealed from the building exterior to which the gaseous contents of the enclosure 100 were delivered prior to the closing of register 118. The blower 142 continues to operate after the closure of register 118 and causes the withdrawal of gas from the protective air lock 102 and from the interior of the hollow door 120. Any leakage of uranium hexafluoride to adjacent enclosures through the plaster wall 106 or past the wall at points at which it is adjacent a surface which pierces the air lock, is restricted in that it is prevented from passing the outer structurally supporting wall 104 by the continuous withdrawing action of the blower 142 on gas entering the air lock 102. It is important to note that, whereas, the relatively small quantities of uranium hexafluoride leakage are not toxic in the atmosphere exterior to the building, the accumulation of equal quantities of uranium hexafluoride in enclosures adjacent that protected by air lock 102 may be sufficient to be toxic.

Most of the uranium hexafluoride which escapes from the apparatus is restricted to enclosure 100 by the sealing action on the registers and door. In order to render this gas harmless, one of several alternative procedures is used. For example, a jet of steam, introduced into the enclosure through conduit 153, causes the hydrolysis of uranium hexafluoride to form a solid hydrolysis product, uranyl fluoride, ($UO_2F_2$), and gaseous hydrogen fluoride. Flow of steam to the enclosure is regulated by means of valve 155. The solid hydrolysis product, uranyl fluoride, ($UO_2F_2$), precipitates to the floor of the enclosure 100 from which it is conveniently removed in the form of a dust. After the dust has settled, the hydrogen fluoride is removed by opening the register 118 sufficiently to cause a relatively slow withdrawal of said gas from the enclosure. Since this gas is lighter than air, it may be dispersed into the atmosphere, preferably through a relatively high stack without danger of injury to personnel in the area adjacent the building. Alternatively the hydrogen fluoride may be passed into a caustic adsorbent bed.

It is apparent from the foregoing description that the apparatus of the present invention provides a very effective means for protecting personnel while engaged in processing toxic materials. It is obvious, in addition, that the apparatus may be readily adapted to disposing of toxic materials which escape accidentally from process equipment without the necessity of closing down operation in adjacent enclosures because the present invention provides for the isolation of the escaped gas to the enclosure containing the process equipment. Furthermore, the toxic gas is disposed of without endangering personnel outside the building or contaminating the area surrounding the building with a heavy lingering gas.

Examples of other toxic gases in connection with which the above-described apparatus may be employed include boron trifluoride, arsenic trichloride, phosphorous trichloride and numerous other volatile halides.

It will be understood that the term "wall" as used in the specification and claims hereof includes not only the vertical but also the horizontal or other defining surfaces.

If the toxic gas is not visible to the unaided eye, an automatic switch may be substituted for the manually operated switch 148 by providing an absorption spectrometer cell in the enclosure 100, which cell acts responsive to a change in the composition of the atmosphere within the enclosure to actuate a relay which will in turn, by means of a motor or other means, close the register 118 and signal the occupants of the enclosure of the presence of toxic contaminants in the atmosphere. Such a spectrometer may be adjusted so as to detect a particular toxic gas acting responsive to the wave absorption characteristics of this toxic gas.

Alternatively, toxic gas may be removed from enclosure 100 by the inclusion therein of an absorption trap in conjunction with a pump which circulates the air in the enclosure 100 through said absorbent, thereby removing said gas from the atmosphere of the enclosure. The switch 148 or an automatic switch may be so connected as to start the circulating pump when the register 118 is closed.

The particular apparatus disclosed in the illustrative embodiment of the present invention has particular utility where an enclosure is partitioned off from a larger enclosure, in that the material of which the walls thereof are composed, is readily available and economical. Thus, for example, material of relatively light construction, such as beaver board or plaster board, may be substituted for the cinder block in construction in which partitioning is the primary object, because the air lock provides sufficient protection against leakage of gas through such partitioning and consequently materials of more substantial bulk are not necessary.

Whereas the embodiment of the present invention discloses an enclosure, the walls of which are protected by an air lock, it will be understood that it is within the scope of the present invention to provide an air lock which completely envelops the enclosure including both ceiling and floor. However, since in most instances the ceiling and floor are substantially impermeable to the passage of gas therethrough, it is necessary, in the usual case, to protect only the walls of the enclosures by an air lock.

Many other alternatives will be apparent to those skilled in the art.

Since many embodiments might be made of the above-described invention and since many changes might be made in the embodiment illustratively disclosed herein, it is to be understood that all matter hereinabove set forth is to be interpreted as illustrative only and not in a limiting sense, except as may be required by the appended claims.

I claim:

1. In combination with a protective ventilating system, an improved building unit affording safety against escape of toxic gases and comprising an outer enclosure, an inner enclosure adapted to house toxic gas processing equipment and spaced from the outer enclosure by a protective air lock space, an air intake extending in sealed relation through said outer enclosure and space into said inner enclosure, single vacuum means connected to said space and to the interior of said inner enclosure, air-removal closure means interposed between said vacuum means and said inner enclosure, said closure means being adapted in closed position to permit an increased air pressure within said inner enclosure and in open position to permit a lowered air pressure therewithin, control means for actuating said air-removal closure means thereby to apply said vacuum exclusively to said air lock space or simultaneously to said space and to the interior of said inner enclosure, a second closure means disposed in said air intake, a second control means for operating said second closure means, said second closure means being adapted in closed position to permit isolation of air in said inner enclosure and in open position to permit air flow into said enclosure, and a third closure means providing ingress and egress to said inner enclosure and adapted in closed position to seal said air lock space against air leakage from both said inner and outer enclosures.

2. Apparatus as described in claim 1 wherein said second control means includes a pressure differential means having one side thereof responsive to the pressure existing within said inner enclosure and another side thereof responsive to the pressure on the outside of said outer enclosure.

3. Apparatus as described in claim 1 wherein said third closure means includes a hollow door having a hollow connection permanently connecting the interior of said door to said air lock space.

4. Apparatus as described in claim 1 wherein said control means for actuating said air-removal closure means is operable from a position on the exterior of said outer enclosure.

5. In combination with a protective ventilating system, an improved building unit comprising an outer enclosure, an inner enclosure spaced from the outer enclosure by an air lock space, an air intake extending in sealed relation through said outer enclosure and space into said inner enclosure, single vacuum means connected to said space and to the interior of said inner enclosure, air-removal closure means interposed between said vacuum means and said inner enclosure, said closure means being adapted in closed position to permit an increased air pressure within said inner enclosure and in open position to permit a lowered air pressure therewithin, control means operable from a position on the exterior of said outer enclosure for actuating said air-removal closure means thereby to apply said vacuum exclusively to said air lock space or simultaneously to said space and to the interior of said inner enclosure, a second closure means disposed in said air intake, a second control means for operating said second closure means and including a pressure differential means having one side thereof responsive to the pressure existing within said inner enclosure and another side thereof responsive to the pressure on the outside of said outer enclosure, said second closure means being adapted in closed position to permit isolation of air in said inner enclosure and in open position to permit air flow into said enclosure, and a third closure means providing ingress and egress to said inner enclosure and adapted in closed position to seal said air lock space against air leakage from both said inner and outer enclosures.

6. In combination with a protective ventilating system, an improved building unit comprising an outer enclosure, an inner enclosure spaced from the outer enclosure by an air lock space, an air intake extending in sealed relation through said outer enclosure and space into said inner enclosure, single vacuum means connected to said space and to the interior of said inner enclosure, air-removal closure means interposed between said vacuum means and said inner enclosure, said closure means being adapted in closed position to permit an increased air pressure within said inner enclosure and in open position to permit a lowered air pressure therewithin, control means for actuating said air-removal closure means thereby to apply said vacuum exclusively to said air lock space or simultaneously to said space and to the interior of said inner enclosure, a second closure means disposed in said air intake, a second control means for operating said second closure means and including a pressure differential means having one side thereof responsive to the pressure existing within said inner enclosures and another side thereof responsive to the pressure on the outside of said outer enclosure, said second closure means being adapted in closed position to permit isolation of air in said inner enclosure and in open position to permit air flow into said enclosure, and a third closure means including a hollow door having a hollow connection permanently connecting the interior of said door to said air lock space, said door providing ingress and egress to said inner enclosure and adapted in closed position to seal said air lock space against air leakage from both said inner and outer enclosures.

* * * * *